US008782254B2

(12) United States Patent
Duvvuru

(10) Patent No.: US 8,782,254 B2
(45) Date of Patent: Jul. 15, 2014

(54) DIFFERENTIATED QUALITY OF SERVICE CONTEXT ASSIGNMENT AND PROPAGATION

(75) Inventor: Sreeram Duvvuru, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1335 days.

(21) Appl. No.: 09/896,244

(22) Filed: Jun. 28, 2001

(65) Prior Publication Data

US 2003/0018766 A1 Jan. 23, 2003

(51) Int. Cl.
*G06F 15/16* (2006.01)
*G06F 15/173* (2006.01)

(52) U.S. Cl.
USPC ........... 709/228; 709/203; 709/224; 709/226; 709/232

(58) Field of Classification Search
USPC ................. 709/238, 230, 228, 229, 217–219, 709/223–226, 232–235, 244
See application file for complete search history.

(56) References Cited

U.S. PATENT DOCUMENTS

| | | | | |
|---|---|---|---|---|
| 5,689,708 A | * | 11/1997 | Regnier et al. ................ | 709/229 |
| 5,694,548 A | * | 12/1997 | Baugher et al. ............... | 709/227 |
| 6,006,264 A | * | 12/1999 | Colby et al. .................. | 709/226 |
| 6,105,063 A | * | 8/2000 | Hayes, Jr. ..................... | 709/223 |
| 6,154,776 A | * | 11/2000 | Martin .......................... | 709/226 |
| 6,161,139 A | * | 12/2000 | Win et al. ..................... | 709/225 |
| 6,167,445 A | * | 12/2000 | Gai et al. ...................... | 709/223 |
| 6,295,532 B1 | * | 9/2001 | Hawkinson ...................... | 707/4 |
| 6,434,607 B1 | * | 8/2002 | Haverstock et al. .......... | 709/217 |
| 6,446,122 B1 | * | 9/2002 | Rawat et al. .................. | 709/224 |
| 6,449,647 B1 | * | 9/2002 | Colby et al. .................. | 709/226 |
| 6,453,353 B1 | * | 9/2002 | Win et al. ...................... | 709/229 |
| 6,463,068 B1 | * | 10/2002 | Lin et al. ....................... | 370/414 |
| 6,466,984 B1 | * | 10/2002 | Naveh et al. .................. | 709/228 |
| 6,578,077 B1 | * | 6/2003 | Rakoshitz et al. ............ | 709/224 |
| 6,668,046 B1 | * | 12/2003 | Albal ............................. | 379/119 |
| 6,728,748 B1 | * | 4/2004 | Mangipudi et al. ........... | 709/226 |
| 6,738,819 B1 | * | 5/2004 | Li et al. ......................... | 709/229 |
| 6,742,016 B1 | * | 5/2004 | Bhoj et al. .................... | 709/207 |
| 6,862,624 B2 | * | 3/2005 | Colby et al. .................. | 709/226 |
| 6,865,185 B1 | * | 3/2005 | Patel et al. .................... | 370/412 |
| 6,917,617 B2 | * | 7/2005 | Jin et al. ................... | 370/395.21 |

(Continued)

OTHER PUBLICATIONS

Emil Lupu, Morris Sloman, Zoran Milosevic, "Use of Roles and Policies for Specifying and Managing a Virtual Enterprise," Ninth International Workshop on Research Issues on Data Engineering: Information Technology for Virtual Enterprises, pp. 72-79, 1999.*

(Continued)

*Primary Examiner* — Patrice Winder
*Assistant Examiner* — Angela Widhalm
(74) *Attorney, Agent, or Firm* — Robert C. Kowert; Meyertons, Hood, Kivlin, Kowert & Goetzel, P.C.

(57) ABSTRACT

A method, system and article of manufacture for providing differentiated quality of service in an application server may include receiving a request and accessing pre-determined policy data in a server system. The pre-determined policy data may depend upon the particular client sending the request. A request may include identity, role, requested service, and/or time constraint information. Based upon the request and policy data, a quality of service context may be established, possibly including service class, priority, and/or deadline attributes. The quality of service context may be propagated in the server system with the request.

27 Claims, 8 Drawing Sheets

(56) References Cited

U.S. PATENT DOCUMENTS

| | | | |
|---|---|---|---|
| 6,941,465 B1* | 9/2005 | Palekar et al. | 726/1 |
| 6,957,258 B2* | 10/2005 | Maher et al. | 709/224 |
| 6,981,029 B1* | 12/2005 | Menditto et al. | 709/217 |
| 7,027,457 B1* | 4/2006 | Chiussi et al. | 370/414 |
| 7,106,756 B1* | 9/2006 | Donovan et al. | 370/468 |
| 7,206,848 B1* | 4/2007 | Zara et al. | 709/229 |
| 7,213,071 B2* | 5/2007 | DeLima et | 709/227 |
| 7,277,948 B2* | 10/2007 | Igarashi et al. | 709/227 |
| 7,792,962 B2* | 9/2010 | Mager et al. | 709/225 |
| 2001/0024434 A1* | 9/2001 | Ayyagari et al. | 370/347 |
| 2002/0016840 A1* | 2/2002 | Herzog et al. | 709/225 |
| 2002/0031089 A1* | 3/2002 | Elloumi et al. | 370/235 |
| 2002/0035699 A1* | 3/2002 | Crosbie | 713/201 |
| 2002/0059170 A1* | 5/2002 | Vange | 707/1 |
| 2002/0116488 A1* | 8/2002 | Subramanian et al. | 709/224 |
| 2002/0118644 A1* | 8/2002 | Moir | 370/230.1 |
| 2002/0143981 A1* | 10/2002 | DeLima et al. | 709/233 |
| 2003/0039210 A1* | 2/2003 | Jin et al. | 370/229 |

OTHER PUBLICATIONS

Lutfiyya et al., "Issues in Managing Soft QoS Requirements in Distributed Systems Using a Policy-based Framework," In Proceedings of the international Workshop on Policies for Distributed Systems and Networks (Jan. 31, 2001). M. Sloman, J. Lobo, and E. Lupu, Eds. Lecture Notes in Computer Science, vol. 1995. pp. 185-201.*

Otto Alhava, *Quality of Service*, last updated on Mar. 23, 2000, http://searchNetworking.techtarget.com/sDefinition/O11sid7_gci213826,00.htm as of Apr. 25, 2001.

Vicki Johnson, Interconnect Technologies Corp., *A Quality of Service glossary of terms*, http://www.qostorum.com/docs/glossary/glossary.htm as of Apr. 24, 2001.

* cited by examiner

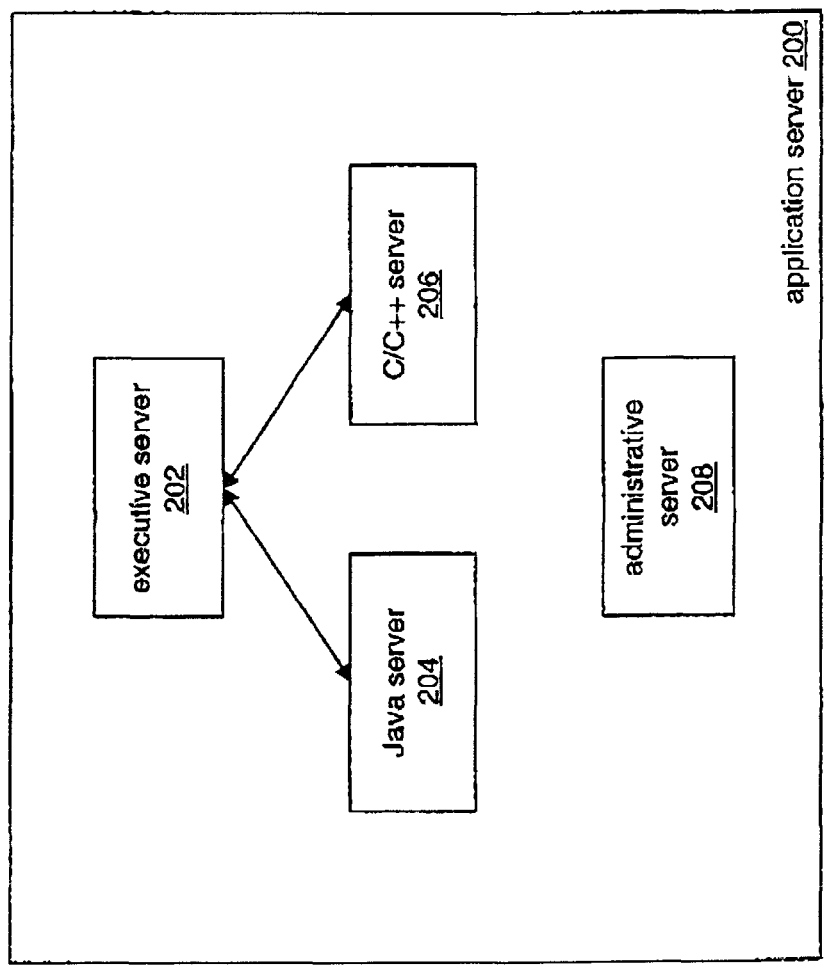

DIFFERENTIATED QUALITY OF SERVICE CONTEXT ASSIGNMENT AND PROPAGATION

TECHNICAL FIELD

The present invention relates generally to computer software that enables disparate levels of service and more particularly to differentiated quality of service context assignment and propagation in an application server.

BACKGROUND

The field of application servers has recently become one of the fastest-growing and most important fields in the computing industry. As web applications and other distributed applications have evolved into large-scale applications that demand more sophisticated computing services, specialized application servers have become necessary in order to provide a platform supporting these large-scale applications. Applications that run on application servers are constructed according to an n-tier architecture, in which presentation, business logic, and data access layers are kept separate. The application server space is sometimes referred to as "middleware", since application servers are often responsible for deploying and running the business logic layer and for interacting with and integrating various enterprise-wide resources, such as web servers, databases, and backend or legacy systems. For example, an application server may act as a platform hub connecting web servers, database servers/services, e-commerce servers/services, backend or legacy systems, or any of various other types of systems or services. A key benefit of many application servers is that they not only provide this service/system integration, but also provide centralized administrative or management tools for performing various aspects of system and application administration.

Despite this offering, and the scalability and reliability of application servers, many application servers lack differentiated quality of service. Quality of service is referred to as a collective measure of the level of service provided to a customer.

Traditionally, quality of service has been used in internetworking switching/routing protocols and real-time media streaming, for example, and is characterized by basic performance criteria including availability (low downtime), error performance, response time and throughput, connection set-up time, and speed of fault detection and correction. This type of quality of service is established during Transmission Control Protocol (TCP) or upper layer connection negotiation and relies on intervening routers to honor the quality of service identifiers or hints, which are set in headers. These hints, however, are not application visible, and thus cannot be used to create a differentiated quality of service level or context in the application server space.

As a result, in the application server space, it is desirable to provide a differentiated quality of service that is propagated throughout all activities that a particular request generates. This type of differentiated quality of service in the application server space can allow for smarter and more satisfying services while providing an efficient means by which a provider of services can structure and manage fees for such services. Consider, for example, a brokerage firm who provides, over a network, services such as obtaining quotes, performing research, and trading securities on financial exchanges. Such a firm may create several service classes of preferred customers, such as Platinum, Gold, and Silver. These types of customers can thus enjoy superior and faster service of their requests based on their particular service class, the type of transaction desired, and the time constraint, if any, applicable to such request.

SUMMARY

Briefly, in accordance with one embodiment of the invention, a computer-implemented method for providing differentiated quality of service in an application server, includes: receiving a request and providing pre-determined policy data. Based on the request and policy data, a quality of service context is established and propagated with the request.

Briefly, in accordance with another embodiment of the invention, an article includes: a memory medium including program instructions executable to: receive a request and provide pre-determined policy data. Based on the request and policy data, a quality of service context is established and propagated with the request.

Briefly, in accordance with still another embodiment of the invention, a first computer system including a processor and a memory storing program instructions. The processor is operable to execute the program instructions to: receive a request and provide pre-determined policy data. Based on the request and policy data, a quality of service context is established and propagated with the request.

BRIEF DESCRIPTION OF THE DRAWINGS

The subject-matter regarded as the invention is particularly pointed out and distinctly claimed in the concluding portion of the specification. The invention, however, both as to organization and method of operation, may best be understood by reference to the following detailed description, when read with the accompanying drawings, in which:

FIG. 2 is a block diagram illustrating one embodiment of an application server and processes that run on the application server;

DETAILED DESCRIPTION

In the following detailed description, numerous specific details are set forth in order to provide a thorough understanding of the invention. However, it will be understood by those skilled in the relevant art that the present invention may be practiced without these specific details. In other instances, well-known methods, procedures, and components have not been described in detail so as not to obscure the present invention.

Exemplary Application Architectures

Figure 1A:
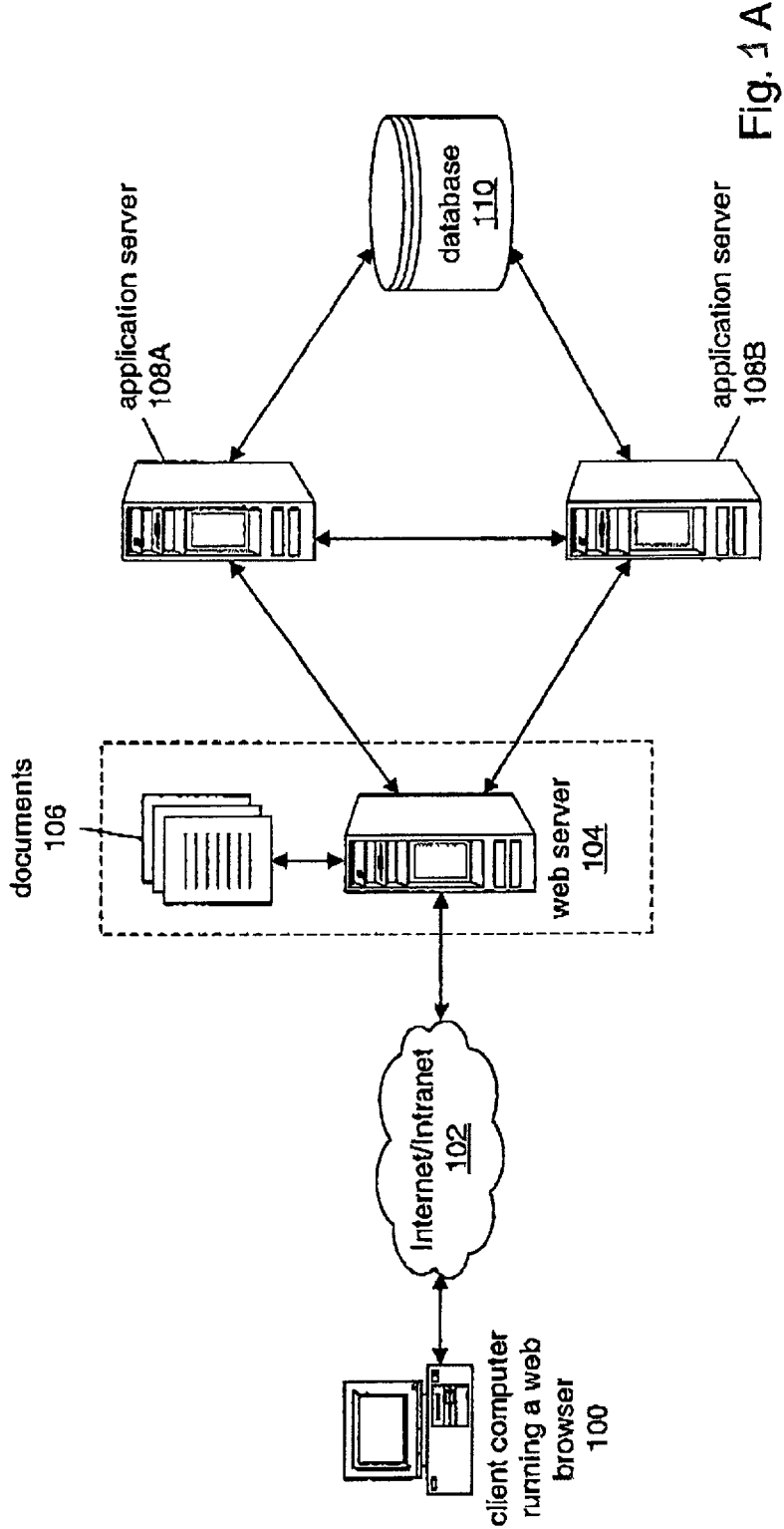
FIGS. 1A-1C illustrate exemplary architectures for networked applications running on application servers.
Figure 1B:
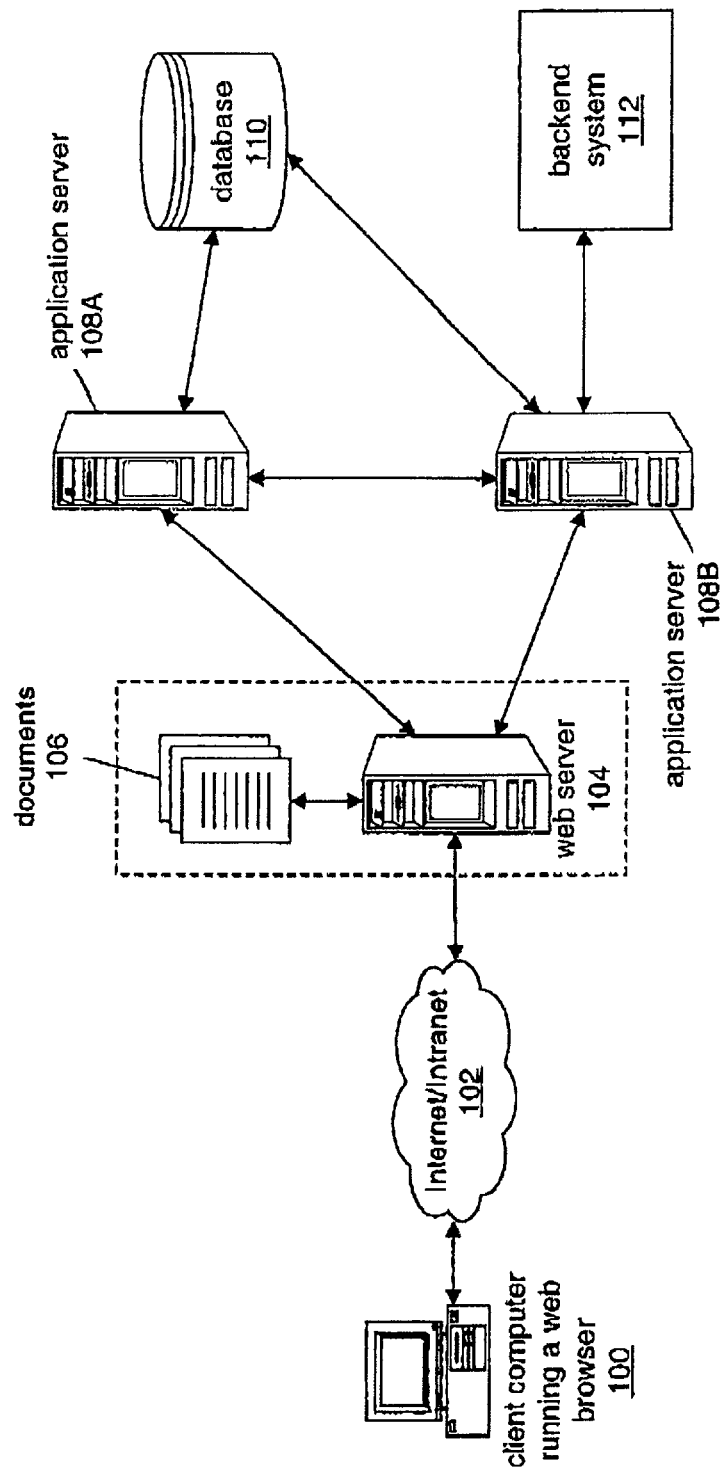
Figure 1C:
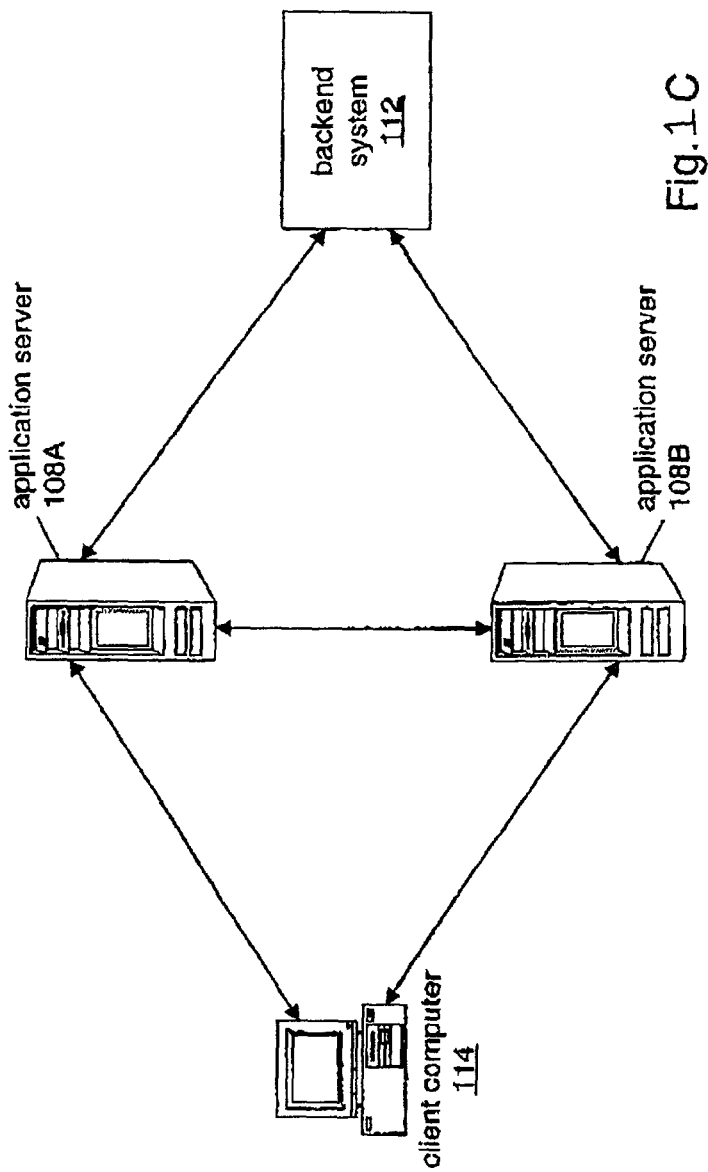

FIGS. 1A-1C illustrate exemplary architectures for networked applications running on application servers. There are, of course, many possible architectural variations, and FIGS. 1A-1C are exemplary only.

FIG. 1A illustrates an exemplary architecture for a web application. In general, a web application may be defined as an Internet or Intranet-based application comprising a collection of resources that are accessible through uniform resource locators (URLs). The resources may include web pages comprising HTML, XML, JSP, scripting code such as Javascript or VBScript, or other types of elements. The resources may also include any various types of executable programs or components, such as CGI programs, Java servlets, JavaBeans components, CORBA components, downloadable code such as Java classes or ActiveX components, etc. The resources may also include any other type of resource addressable through a URL.

The embodiment of FIG. 1A illustrates a client computer 100 running a web browser, such as the Netscape Navigator or Microsoft Internet Explorer web browsers. It is noted that the web-browser need not be a web browser per say, but may be any of various types of client-side applications that include web-browsing functionality. For example, Microsoft Corp. provides programming interfaces enabling applications to incorporate various web-browsing capabilities provided by the Microsoft Internet Explorer code base.

The web browser may run in any type of client computer 100. For example, the web browser may run in a desktop computer or workstation running any of various operating systems, such as Windows, Mac OS, Unix, etc., or the web browser may run in a portable computing device, such as a personal data assistant, smart cellular phone, etc. The client computer 100 may use a network connection for communicating with a web server 104 via a network 102, such as the Internet or an Intranet. The client network connection may be a connection of any type, such as a PPP or SLIP dialup link, an Ethernet or token ring connection, an ISDN connection, a cable modem connection, any of various types of wireless connection, etc. Although web applications are often associated with particular communication protocols, such as HTTP or SSL, it is noted that any communication protocol, including TCP-based protocols and UDP-based protocols, may be used to communication over the network 102.

As the web server 104 receives a request from a client computer 100, the web server may treat the request differently, depending on the type of resource the request references. For example, if the request references a document 106, such as an HTML document, then the web server may process the request itself, e.g., by retrieving the document from the web server's local file system or from a local cache and returning the document to the client computer. For other types of requests, e.g., requests referencing executable components, such as Java servlets, Enterprise JavaBeans™ (EJB) components, C program modules, Common Object Request Broker Architecture (CORBA) components, etc., the web server may broker the request to an application server 108. For example, as shown in FIG. 1A, there may be a plurality of application servers 108, and the web server may select an application server to which to broker the request, e.g., using load balancing techniques. The web server 104 may interface with an application server 108 using various techniques, e.g., through an in-process extension, such as an ISAPI or NSAPI extension.

The application server 108 may be configured as a part of an application server cluster, as described above and shown in FIG. 1A. Although FIG. 1A illustrates an application server cluster with only two application servers, it is noted that the cluster may comprise any number of application servers. Each application server may interface with various types of other servers or systems. For example, as illustrated in FIG. 1A, the application servers may communicate with database 110. Each application server in the cluster may interface with the same systems, or the application servers may differ in which systems they interface with. For example, FIG. 1B is similar to FIG. 1A, but in the embodiment of FIG. 1B, application server 108B is shown to interface with a backend system 112, e.g., a Customer Information Control System (CICS), R/3, PeopleSoft, or other type of backend system. Application servers in a cluster may not need to be in close physical proximity to each other.

It is noted that, in alternative embodiments, a client computer may communicate directly with an application server or application server cluster, without interfacing through a web server. FIG. 1C illustrates an example of a client computer 114 communicating directly with application server(s) 108. For example, the application servers may run an enterprise resource planning application, and the client computer 114 may be a computer within the enterprise that is connected to the application servers 108 via a WAN. In this example, the client computer may run "thick client" software, e.g., client software that comprises a portion of the enterprise resource planning application logic. The client computer software may interface directly with executable programs or components running on the application servers, e.g., through a protocol such as the Internet Inter-Orb Protocol (IIOP), Remote Method Invocation (RMI), or Kiva Communication Protocol (KCP).

As shown, the application server(s) 108 may also interact with a backend system 112, such as CIS, R/3, PeopleSoft, or other type of backend system. For example, the backend system 112 may be responsible for managing enterprise data or performing business functions for the enterprise.

As noted above, FIGS. 1A-1C are exemplary architectures only, and many variations are possible. As a small handful of examples of alternative embodiments, multiple web servers may be present to receive requests from client computers and broker the requests to application servers, the web server may itself interface directly with a database, application servers may interface directly with various other types of systems, such as specialized authentication servers, e-commerce servers, other types of legacy systems, etc.

Service and Component Management

Applications that run on application servers are often constructed from various types of software components or modules. These components may include components constructed according to a standard component model. For example, an application may comprise various types of standard Java™ components such as EJB components, JSP, Java servlets, etc. An application may also comprise any of various other types of components, such as CORBA, (Distributed) Common Object Model (COM/DCOM) components, or components constructed according to various proprietary component models. Further, in some component architectures, such as Sun Microsystems' EJB's and Microsoft's COM, a container is an application program or subsystem in which a component is run.

Each request that an application server receives from a client may reference a particular application component. Upon receiving a request, the application server may determine the appropriate component, invoke the component, and return the execution results to the client. Some application components may reference functionality of a backend system coupled to the application server. In one embodiment, the application server may utilize information stored in a repository to access functionality of the backend system, as described in detail below.

In various embodiments, it may be necessary or desirable for different types of application server components to run within different environments. For example, an application server may support both components written using the Java programming language and components written using the C or C++ programming languages. In such a case, the different types of components may be managed by particular processes or engines.

Figure 3:
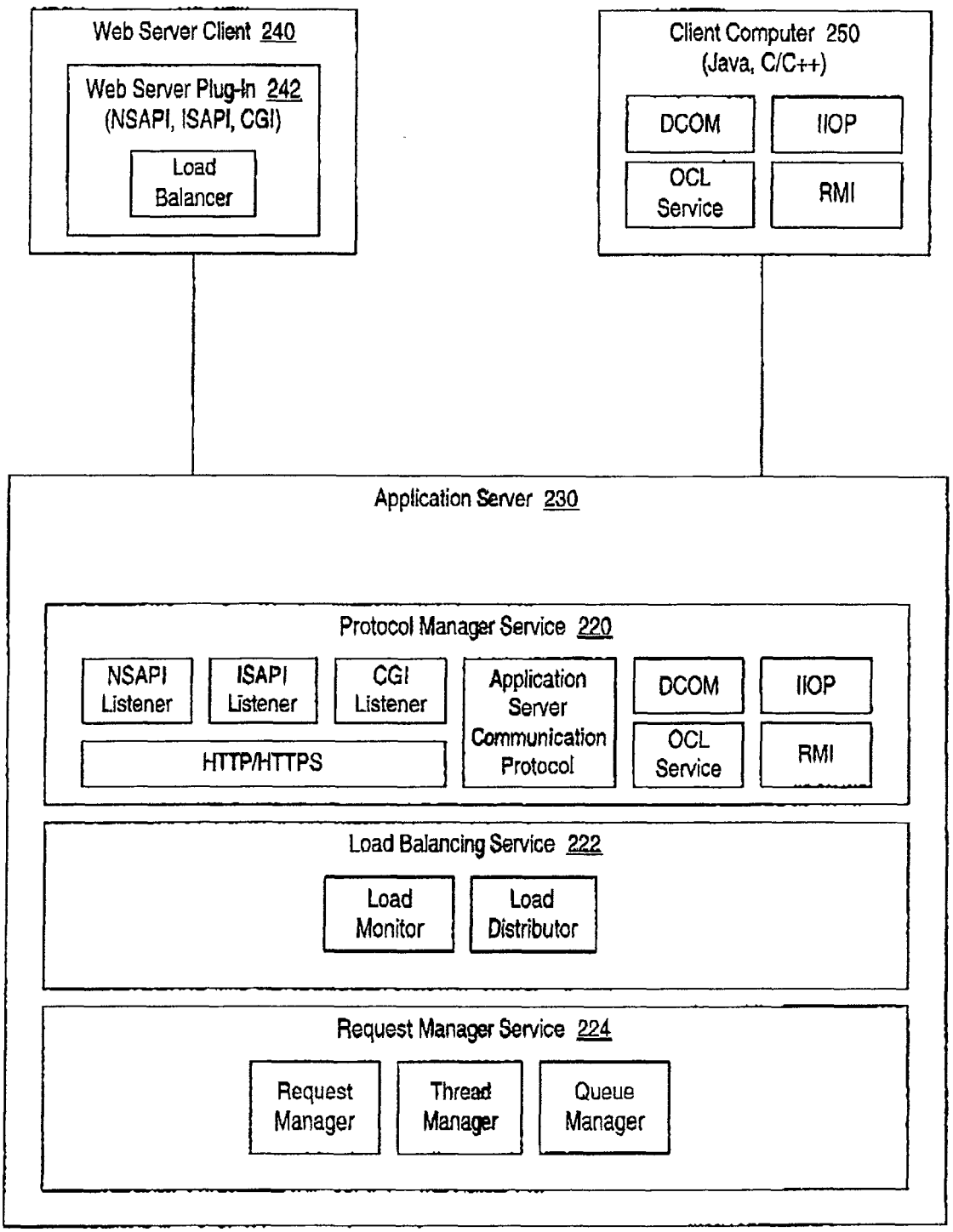
FIG. 3 illustrates several system-level services that may be involved in managing application server requests.

For example, FIG. 3 illustrates an application server 200 in which a process referred to as the "executive server" 202 runs. As shown, the executive server 202 interfaces with a process 204, referred to as a "Java server" and a process 206 referred to as a "C/C++" server". In this embodiment, the executive server 202 may receive client requests, assign the client requests to a particular thread, and forward the requests to either the Java server 204 or the C/C++ server 206, depending on whether the requests reference a component that executes within a Java runtime environment or a C/C++ runtime environment. The Java server or C/C++ server may then load and execute the appropriate component or module.

In addition to interfacing with the Java and C/C++ servers, the executive server 202 may also manage various system-level services. For example, as discussed below, the executive server may manage a load balancing service for distributing requests to other application server computers in a cluster, a request manager service for handling incoming requests, a protocol manger service for communicating with clients using various protocols, an event logging service for recording conditions or events, etc.

In addition to managing application components, the Java server 204 and the C/C++ server 206 may also host and manage various application-level services used by the application components. These application-level services may include services for managing access to databases and pooling database connections, services for performing state and session management, services for caching output results of particular application components, service for communicating with backend systems, or any of various other services such as described above.

FIG. 2 also illustrates a process 208 referred to as the "administrative server". As described above, an application server environment may provide an administrative tool for adjusting various factors affecting application execution and performance. In the embodiment of FIG. 3, such administrative tool may interface with the administrative server 208 to adjust these factors. For example, the administrative tool 208 may be enabled to adjust the event logging criteria used by the executive server's event-logging service, adjust the number of database connections pooled by the Java or C/C++ server's data access service, etc. The administrative server 208 may also provide failure recovery by monitoring the executive server, Java server, and C/C++ server processes and restarting these processes in case of failure.

FIG. 2 of course represents an exemplary architecture for managing application components, system-level services, and application-level services, and various other embodiments are contemplated. For example, although FIG. 2 is discussed in terms of Java™ and C/C++ components, various other processes or engines may be present for executing other types of software components or modules. Also, various embodiments may support multiple component management processes, e.g., multiple Java server processes or C/C++ server processes. The number of processes may be adjusted via an administrative tool interfacing with the administrative server.

Application Server System-Level Services

FIG. 3 illustrates several exemplary system-level services which may be involved in managing application server requests. In one embodiment, these system-level services may be managed by an executive server process such as described above with reference to the FIG. 2 application server.

FIG. 3 illustrates a protocol manager service 220. The protocol manager service 220 is responsible for managing network communication between the application server 230 and clients of the application server. For example, FIG. 3 illustrates a web server client 240 which comprises a standard web server extension or plug-in 242. The web server plug-in 242 may by any of various well known types of plug-ins enabling web servers to communicate with other systems, including NSAPI, ISAPI, optimized CGI, etc. As shown, the protocol manager service 220 includes "listener" modules or components, e.g., NSAPI listener, ISAPI listener, etc., for communicating with the web server plug-in. The listener modules may communicate with the web server plug-in via the standard HTTP or HTTPS protocols, for example.

FIG. 3 also illustrates that other types of clients besides web servers may communicate with the application server 230. For example, a client computer 250 is shown. The client computer 250 may run an application program, such as a program written in Java™ or C++, that communicates with the application server 230 using any of various communication protocols. For example, as shown in FIG. 3, the protocol manager service 220 may support such protocols as IIOP, RMI, DCOM, OCL Service, KCP, or any of various other protocols such as JAXM (Java API for XML messaging) or SOAP (Simple Object Access Protocol). As an example, an administration program for configuring an application server may communicate directly with the application server 230 through such a protocol, rather than routing requests through a web server.

As shown in FIG. 3, an application server may also include a load balancing service 222. In the case of application server clustering, requests may be processed by the load balancing service in order to determine whether the request should be processed by the current application server or would be better served by forwarding the request to another application server in the cluster.

As shown in FIG. 3, an application server may also include a request manager service 224. Once the load balancing service determines that the current application server should process the client request (if load balancing is applicable), the request manager service is responsible for managing the processing of the request. As shown in FIG. 3, the request manager service 224 may include several components or modules, such as request manager, a thread manager, and a queue manager. In one embodiment, client requests may be processed in a multi-threaded fashion. The thread manager module may manage a pool of threads available for processing requests. In one embodiment, the number of threads in the pool may be adjusted using an administrative tool.

When the request manager module receives a client request, the request manager module may call the thread manager module to attempt to assign the client request to a thread. If no threads are currently available, then the request manager module may call the queue manager to queue the request until a thread becomes available. The queue manager module may maintain information regarding each client request, such as the request ID, the processing status, etc.

Differentiated Quality of Service Context Assignment and Propagation

Figure 4A:
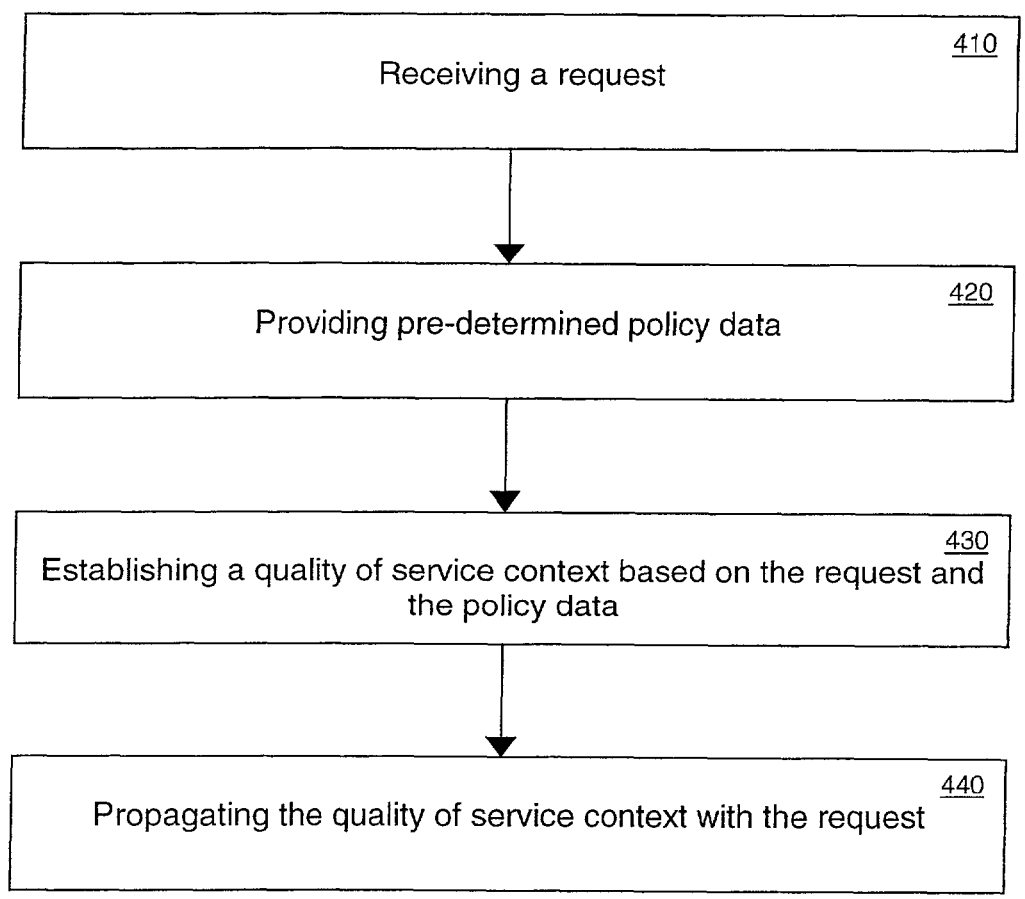
FIGS. 4A-4B illustrate one embodiment of the quality of service context and the quality of service context assignment and propagation.

FIG. 4A illustrates a method for automatically (i.e., programmatically) providing differentiated quality of service context assignment and propagation in an application server. As shown in block 410 within FIG. 4A, an application server initially receives a request from a client. This request is then parsed for user and service information. A request may be encoded with information such as user identity (e.g., johndoe), current user role (e.g., platinumservicerep), requested service (e.g., setupwiretransfer or buystockatmarket), and/or time constraint (e.g., completebefore:<time>), if such request is part of an already established user session. If the request is not part of an already established user session, this same or similar information can be obtained or extracted from the request using pre-determined policy data as described in detail below. The above exemplary request may have come from a customer service representative in a brokerage firm, such as John Doe who logged in as a Platinum Customer Service Desk Representative and is setting up a wire transfer request on behalf of a customer for a market order on a stock, and the firm may be providing a trade execution latency guarantee (i.e., execute the order in the next 20 seconds).

Pre-determined policy data is provided, as shown in block 420, at the application server and/or web server level depending upon the particular client sending the request as described in detail below. Policy data includes pre-determined policy rules and information that define how resources are to be allocated among clients. Based on the policy data and information within the request, service class, priority, and/or deadline attributes are determined, as described in detail below, thereby establishing a quality of service context, as shown in block 430.

Figure 4B:
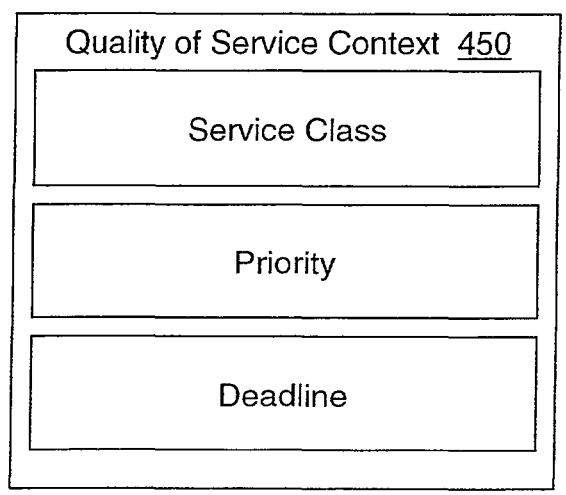

Quality of service context is a collective measure of the level of service provided to a customer. It is used in the present embodiment to determine what level of service must be provided to a particular user and request. As shown in FIG. 4B, the quality of service context, represented by block 450, includes service class, priority, and/or deadline attributes.

The service class attribute is a numeric representation within service categories. For example, in a brokerage trading system the following pre-determined policy data could include: Platinum=1, Gold=2, Silver=3, and Bronze=4. Based on this policy data and cookie information or user identity and/or current user role, available when EJBs are invoked for example, the service class is determined.

The priority attribute is a further ranking of service level within a service class and is determined based on policy data and the requested service (i.e., the name of a particular request). For example, referring again to an exemplary brokerage trading system, policy data can define that it is more important to fulfill a "security trade" request than fulfill a "research" request.

The deadline attribute refers to a time constraint, if any, for fulfilling a particular request. Based on policy data and the particular services offered, deadlines may not be guaranteed unless the service itself is deployed on an end-to-end real-time platform.

Accordingly, based on policy data and information within the request, the service class, priority, and/or deadline attributes are determined, as shown in FIG. 4B, thereby establishing the quality of service context, as shown in block 430 in FIG. 4A.

In one embodiment, the quality of service context is established at an ingress point. The ingress point can vary based upon the client sending the request. For example, if a web server client processes a request, such as an HTTP request, (i.e., to obtain static HTML web pages or dynamic content produced by servlets and JSPs), the web server client acts a gateway for such request and either forwards the request to an application server or executes the request itself. In either case, the web server client can establish the quality of service context at the web server plug-in within the web server client.

Additionally, the request could take the form of an EJB method invocation request. This type of request could originate in another application server or from a client computer. In this instance, the quality of service context for the EJB method invocation request can be established at the protocol manager service within the application server. For example, direct EJB requests can use RMI/IIOP protocol where an Object Request Broker (ORB) acts as a gateway. At this gateway the quality of service context can be established. Likewise, the request could be an XML encoded message request, transmitted over HTTP protocol using a standard message envelop, such as SOAP Messages with Attachments or Secure Multi-Purpose Internet Mail Extensions (MIME) Messages for example. This type of message request can be exchanged between web services executing on application servers and contain several headers. Where both application servers are using quality of service context assignment and propagation, pre-determined headers and tags are introduced in the messages, to insert and extract user identity, current user role, requested service, and time constraint. In this instance, the quality of service context for the XML encoded message request can also be established at the protocol manager service within the application server.

In each type of exemplary request, as discussed above, the quality of service context is established at the associated ingress point. Further, at each ingress point there exists a policy file or policy data, as explained above, which includes pre-determined policy rules and information that define how resources are to be allocated among clients. As described above, based on the policy data and the information encoded within the client request, a quality of service context is established.

Referring again to FIG. 4A, once a quality of service context is established, it is propagated with the client request, as shown in block 440, as it is sent for execution in the application server. In one embodiment, there are communication protocols, such as IIOP for example, where EJB method invocation requests are propagated with a security and/or transaction context including user identity, current user role, and requested service information. As a result, the quality of service context can be inserted adjacent to the security and/or transaction information and little, if any, modification to such communication protocols is necessary. The quality of service context, therefore, can be propagated with the client request as other information is propagated with client requests under existing and future communication protocols.

Furthermore, once a quality of service context is established, it can be propagated, for example, to a load balancing service, as described above, that dispatches the request including the quality of service context, to an application server in a cluster or plurality of application servers, as described above, based on the quality of service context and the capabilities and current performance levels for each application server.

Once the request including the quality of service context is received by the preferred application server, the request manager service within the application server can further dispatch the request including the quality of service context to a component in a plurality of components, as described above, based on the quality of service context and the capabilities and current performance levels for each component.

In still another embodiment, when a request leaves the application server after execution, and passes an ingress point or gateway on the way back to the client, the inserted quality of service context is stripped off or hidden in pre-determined locations, as specified by the policy data.

In still another embodiment the quality of service context is propagated with subsequent requests related to the initial client request (e.g., sub-requests) for efficiency and processing purposes.

Exemplary Hardware Architecture

Figure 5:
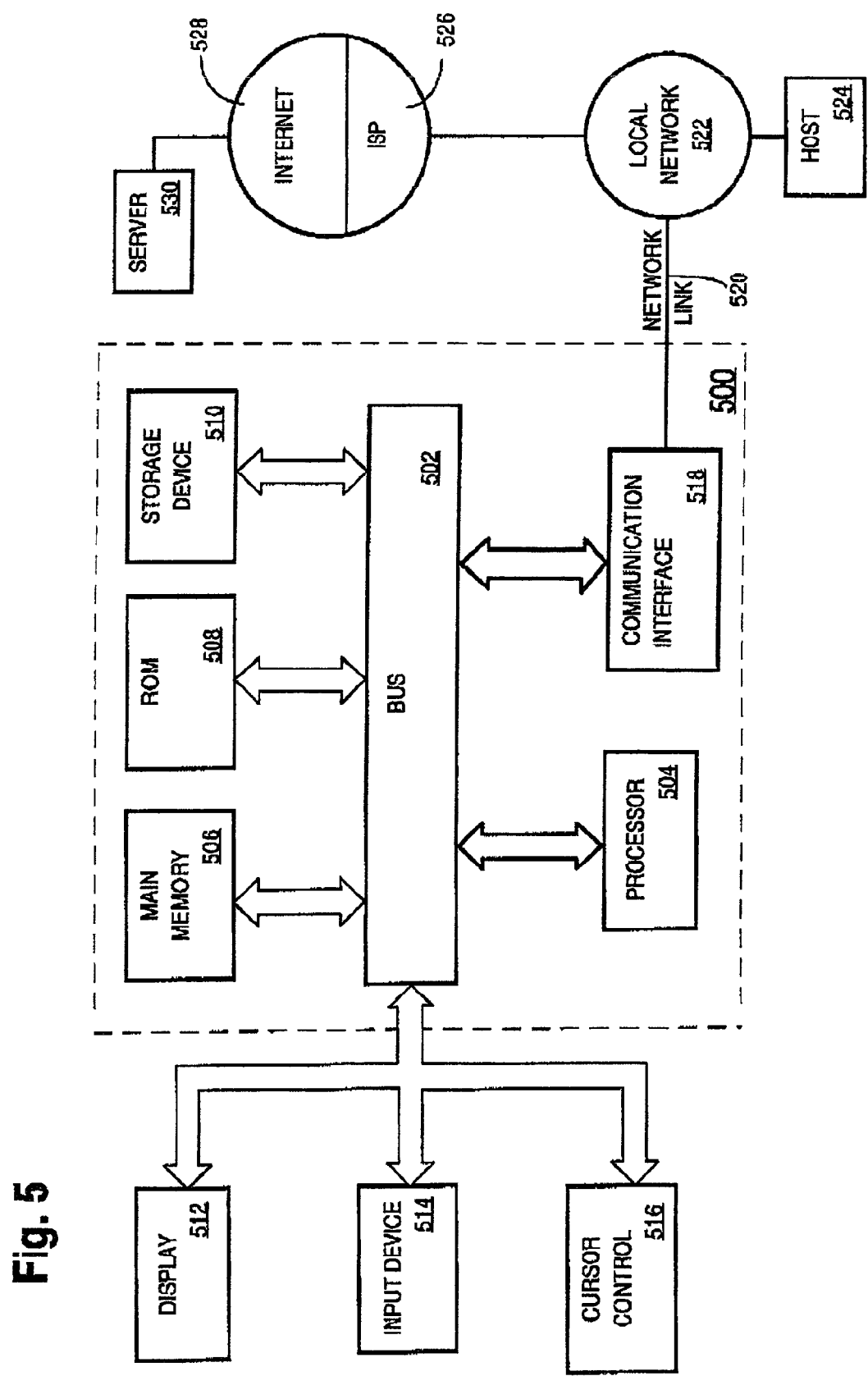
FIG. 5 is a block diagram of a computer system in which the present invention may be embodied.

FIG. 5 shows a hardware block diagram of a computer system 500 in which an embodiment of the invention may be implemented. Computer system 500 includes a bus 502 or other communication mechanism for communicating information, and a processor 504 coupled with bus 502 for processing information. Computer system 500 also includes a main memory 506, such as random access memory (RAM) or other dynamic storage device, coupled to bus 502 for storing information and instructions by processor 504. Main memory 506 may also be further used to store temporary variables or other intermediate information during execution of instructions by processor 504. Computer system 500 further includes a read only memory (ROM) 508 or other static storage device coupled to bus 502 for storing static information and instructions for processor 502. A storage device 510, such as a magnetic or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 412, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

According to one embodiment, the functionality of the present invention is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission data includes coaxial cables, copper wire and fiber optics, including the wires that comprise bus 502. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 504 carries the data to main memory 506, for which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

The invention claimed is:

1. A computer-implemented method for providing differentiated quality of service in an application server space, comprising:
 a server system receiving a request for service from a client, wherein said request for service includes an encoding specifying a user identity, an encoding specifying a current user role under which the request was submitted, and an encoding specifying a requested service; and in response to receiving the request for service:
  accessing pre-determined policy data;
  establishing a quality of service context for said request for service in the application server space, wherein said establishing comprises determining one or more attributes of said quality of service context based on both the specified user identity and the specified current user role included in said request for service, and based on said policy data; and
  propagating said quality of service context with said request for service to a plurality of locations in the server system, wherein said propagating comprises:
    sending data indicating the quality of service context to an application server in the server system along with the request for service; and
    sending, by the application server, data indicating the quality of service context along with the request for service to an application component in the server system, such that the quality of service context is made available to both the application server and the application component.

2. The method of claim 1, wherein said request for service further includes information indicating a time constraint.

3. The method of claim 1 wherein said quality of service context includes information indicating service class and a deadline.

4. The method of claim 1 wherein said establishing a quality of service context is completed at an ingress point.

5. The method of claim 4 wherein said ingress point is at least one of a web server or a protocol manager service within said server system.

6. The method of claim 1 further comprising, propagating the same quality of service context with a subsequent sub-request of said request for service.

7. The method of claim 1 wherein said propagating includes inserting said quality of service context into data sent with the request for service adjacent to at least one of a security context and a transaction context.

8. The method of claim 1, wherein said propagating comprises a load balancing service dispatching said request for service, including said quality of service context, to an application server in a plurality of application servers in the server system, based on said quality of service context.

9. The method of claim 1, wherein said propagating comprises a request manager service dispatching said request for service, including said quality of service context, to a software component in a plurality of software components in the server system, based on said quality of service context.

10. A non-transitory computer-readable storage medium, comprising program instructions executable to implement:
a server system, configured to:
  receive a request for service from a client, wherein said request for service includes an encoding specifying a user identity, an encoding specifying a current user role under which the request was submitted, and an encoding specifying a requested service; and
  in response to receiving the request for service:
    access pre-determined policy data;
    establish a quality of service context for said request for service in an application server space, wherein establishing said quality of service context comprises determining one or more attributes of said quality of service context based on both the specified user identity and the specified current user role included in said request for service, and based on said policy data;
    propagate said quality of service context with said request for service to a plurality of locations in the server system, wherein said propagating comprises:
      sending data indicating said quality of service context to an application server in the server system along with said request for service; and
      sending, by the application server, data indicating said quality of service context to an application component in the server system, such that the quality of service context is made available to both the application server and the application component.

11. The non-transitory computer-readable storage medium of claim 10, wherein said request for service further includes information indicating a time constraint.

12. The non-transitory computer-readable storage medium of claim 10, wherein said quality of service context includes information indicating service class and a deadline.

13. The non-transitory computer-readable storage medium of claim 10, wherein said establishing a quality of service context is completed at an ingress point.

14. The non-transitory computer-readable storage medium of claim 13, wherein said ingress point is at least one of a web server or a protocol manager service within said server system.

15. The non-transitory computer-readable storage medium of claim 10, further comprising program instructions executable to: propagate the same quality of service context with a subsequent sub-request of said request for service.

16. The non-transitory computer-readable storage medium of claim 10, wherein said propagating includes inserting said quality of service context into data sent with the request for service adjacent to at least one of a security context and a transaction context.

17. The non-transitory computer-readable storage medium of claim 10, wherein said propagating comprises a load balancing service dispatching said request for service, including said quality of service context, to an application server in a plurality of application servers in the server system, based on said quality of service context.

18. The non-transitory computer-readable storage medium of claim 10, wherein said propagating comprises a request manager service dispatching said request for service, including said quality of service context, to a software component in a plurality of software components in the server system, based on said quality of service context.

19. A first computer system, comprising:
a processor;
a memory storing program instructions;
wherein the processor is operable to execute the program instructions to implement a server system configured to:
  receive a request for service from a client, wherein said request for service includes an encoding specifying a user identity, an encoding specifying a current user role under which the request was submitted, and an encoding specifying a requested service; and
  in response to receiving the request for service, the server system is further configured to:
    access pre-determined policy data;
    establish a quality of service context for said request for service in an application server space, wherein establishing said quality of service context comprises determining one or more attributes of said quality of service context based on both the specified user identity and the specified current user role included in said request for service, and based on said policy data;

propagate said quality of service context with said request for service to a plurality of locations in the server system, wherein said propagating comprises:

sending data indicating said quality of service context to an application server in the server system along with said request for service; and sending, by the application server, data indicating said quality of service context to an application component in the server system, such that the quality of service context is made available to both the application server and the application component.

20. The system of claim 19, wherein said request for service further includes information indicating a time constraint.

21. The system of claim 19, wherein said quality of service context includes information indicating service class and a deadline.

22. The system of claim 19, wherein said establishing a quality of service context is completed at an ingress point.

23. The system of claim 22, wherein said ingress point is at least one of a web server or a protocol manager service within said server system.

24. The system of claim 19, further comprising program instructions to: propagate the same quality of service context with a subsequent sub-request of said request for service.

25. The system of claim 19, wherein said propagating includes inserting said quality of service context into data sent with the request for service adjacent to at least one of a security context and a transaction context.

26. The system of claim 19, wherein said propagating comprises a load balancing service dispatching said request for service including, said quality of service context, to an application server in a plurality of application servers in the server system, based on said quality of service context.

27. The system of claim 19, wherein said propagating comprises a request manager service dispatching said request for service, including said quality of service context, to a software component in a plurality of software components in the server system, based on said quality of service context.

* * * * *

UNITED STATES PATENT AND TRADEMARK OFFICE
CERTIFICATE OF CORRECTION

PATENT NO.           : 8,782,254 B2
APPLICATION NO.      : 09/896244
DATED                : July 15, 2014
INVENTOR(S)          : Duvvuru It is certified that error appears in the above-identified patent and that said Letters Patent is hereby corrected as shown below:

On the Title Page

On page 2, column 2, item (56) under Other Publications, line 6, delete "Ouality" and insert -- Quality --, therefor.

In the Specification

In column 6, line 7, delete "may by" and insert -- may be --, therefor.

In the Claims

In column 11, lines 29-30, in Claim 3, delete "context includes information indicating service class and a deadline." and insert -- context further includes information indicating a deadline. --, therefor.

In column 12, lines 21-22, in Claim 12, delete "context includes information indicating service class and a deadline." and insert -- context further includes information indicating a deadline. --, therefor.

In column 13, lines 22-23, in Claim 21, delete "context includes information indicating service class and a deadline." and insert -- context further includes information indicating a deadline. --, therefor.

Signed and Sealed this
Twenty-first Day of July, 2015

Michelle K. Lee
*Director of the United States Patent and Trademark Office*